(12) United States Patent
Baader et al.

(10) Patent No.: US 7,455,140 B2
(45) Date of Patent: Nov. 25, 2008

(54) METHOD FOR GUARANTEEING RELIABILITY OF EMERGENCY OPERATING CONDITIONS OF A MOTOR VEHICLE TYRES

(75) Inventors: Dirk Baader, Hemsbach (DE); Hermann Gaus, Stuttgart (DE); Gerd Runtsch, Remseck (DE); Juergen Weissenger, Bissingen (DE)

(73) Assignee: DaimlerChrysler AG, Stuttgart (DE)

( * ) Notice: Subject to any disclaimer, the term of this patent is extended or adjusted under 35 U.S.C. 154(b) by 582 days.

(21) Appl. No.: 10/492,156

(22) PCT Filed: Aug. 24, 2002

(86) PCT No.: PCT/EP02/09495

§ 371 (c)(1),
(2), (4) Date: Nov. 3, 2004

(87) PCT Pub. No.: WO03/033284

PCT Pub. Date: Apr. 24, 2003

(65) Prior Publication Data

US 2005/0057347 A1 Mar. 17, 2005

(30) Foreign Application Priority Data

Oct. 11, 2001 (DE) .................... 101 50 384

(51) Int. Cl.
*B60K 31/04* (2006.01)
(52) U.S. Cl. ............. 180/170; 180/412; 180/401; 701/93; 701/96; 73/146.4
(58) Field of Classification Search ........... 180/170, 180/412, 401; 701/93, 79, 29, 96; 73/146.4; 702/138
See application file for complete search history.

(56) References Cited

U.S. PATENT DOCUMENTS

| 4,143,545 | A | * | 3/1979 | Sitabkhan | 73/146.8 |
| 4,159,465 | A | * | 6/1979 | Hatcher | 340/442 |
| 4,574,267 | A | * | 3/1986 | Jones | 340/443 |
| 4,909,074 | A | * | 3/1990 | Gerresheim et al. | 73/146.4 |
| 5,541,573 | A | * | 7/1996 | Jones | 340/444 |
| 5,696,681 | A | * | 12/1997 | Hrovat et al. | 701/70 |
| 6,182,021 | B1 | * | 1/2001 | Izumi et al. | 702/138 |
| 6,510,375 | B2 | * | 1/2003 | Faye | 701/93 |

(Continued)

FOREIGN PATENT DOCUMENTS

DE 3308080 A1 9/1984

(Continued)

OTHER PUBLICATIONS

Notification of Reasons For Refusal dated Apr. 24, 2006 including English Translation (Seven (7) pages).

*Primary Examiner*—Christopher P. Ellis
*Assistant Examiner*—Cynthia F Collado
(74) *Attorney, Agent, or Firm*—Crowell & Moring LLP

(57) ABSTRACT

In a method for ensuring safe tire emergency running operation in a motor vehicle that is equipped with tires that have emergency running properties when the tire pressure is greatly reduced or absent altogether, a device is provided for detecting an emergency running mode of the motor vehicle. The device for limiting the driving speed limits the driving speed of the motor vehicle whenever emergency running is detected.

8 Claims, 1 Drawing Sheet

U.S. PATENT DOCUMENTS

| | | |
|---|---|---|
| 8,510,375 | 1/2003 | Faye |
| 6,980,925 B2 * | 12/2005 | Zheng et al. ................. 702/175 |
| 6,993,449 B2 * | 1/2006 | Koebe et al. ................. 702/138 |
| 7,069,134 B2 * | 6/2006 | Williams ..................... 701/79 |

FOREIGN PATENT DOCUMENTS

| | | | |
|---|---|---|---|
| DE | 3539489 | A1 | 5/1987 |
| DE | 4405093 | A1 | 8/1994 |
| DE | 19751306 | A1 | 8/1998 |
| DE | 19823646 | A1 | 12/1999 |
| DE | 19908701 | A1 | 9/2000 |
| DE | 10050197 | A1 | 8/2001 |
| DE | 10036580 | A1 | 2/2002 |
| EP | 0221522 | A2 | 5/1987 |
| JP | 57-177843 | | 11/1982 |
| JP | 60-67231 | | 4/1985 |
| JP | 62-125905 | A | 6/1987 |
| JP | 7-186645 | A | 7/1995 |
| JP | 10-252520 | A | 9/1998 |
| JP | 2001-225804 | | 8/2001 |
| JP | 2002-317679 | A | 10/2002 |
| WO | WO-0059742 | A1 | 10/2000 |
| WO | WO-0117806 | A1 | 3/2001 |

* cited by examiner

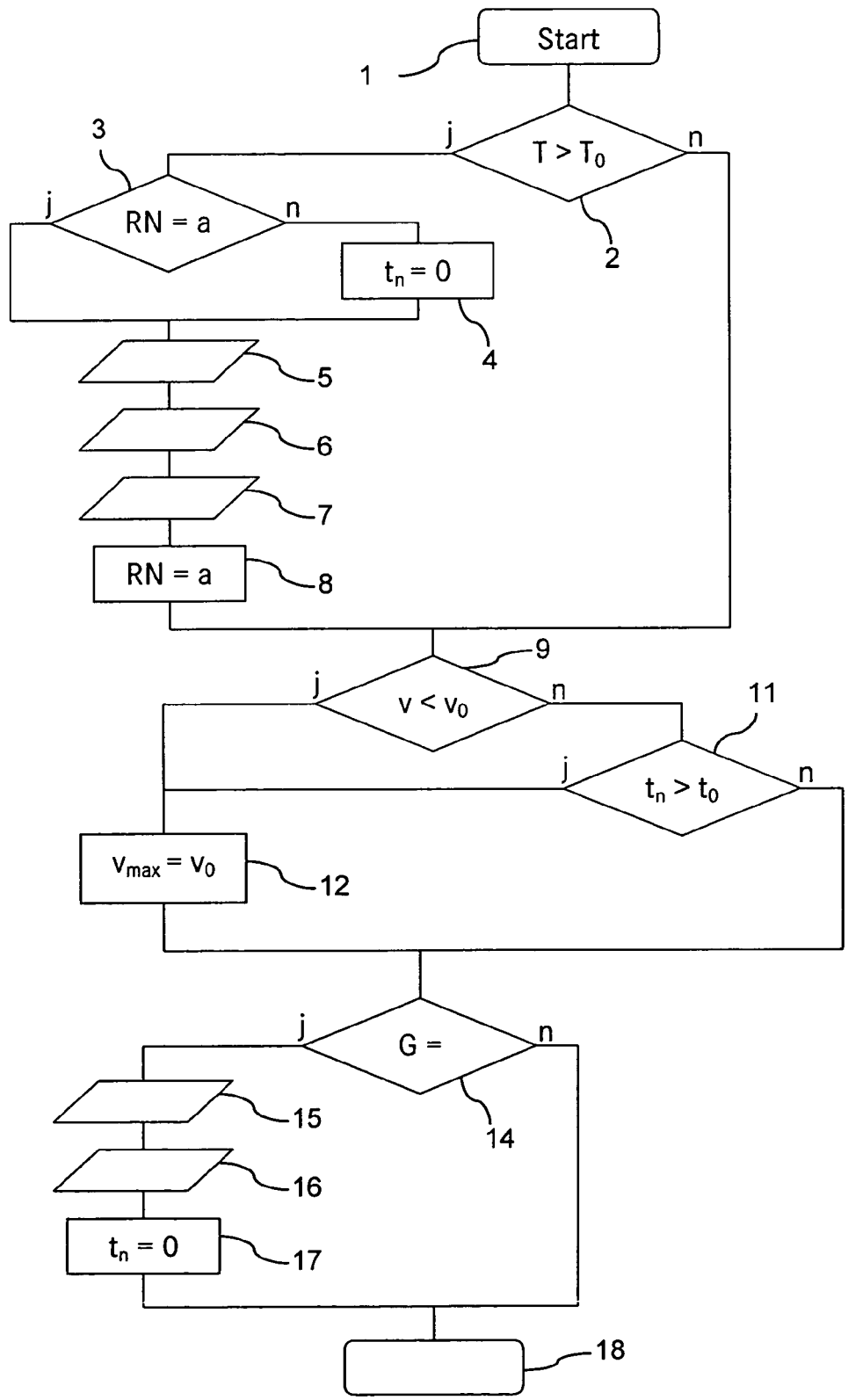
Figure

METHOD FOR GUARANTEEING RELIABILITY OF EMERGENCY OPERATING CONDITIONS OF A MOTOR VEHICLE TYRES

The invention relates to a method for ensuring reliable tire emergency running operation in accordance with the preamble of claim 1.

An emergency running tire in a motor vehicle allows the vehicle to continue to be driven without the need for immediate repair or breakdown assistance in the event of a pressure loss in the tire, since the running properties of an emergency running tire are at least partially retained, even without any air filling the tire. For example, with emergency running tires, it is possible, in an emergency running mode, in which the tire no longer has the regulation filling of air or even no longer has any internal pressure at all, still to cover a residual distance before the tire fails. This residual distance may amount to several hundred kilometers. Both a slow pressure loss caused by a tire defect and a sudden pressure lost caused by an external mechanical action or the action of wear may not be noticed by the driver of the motor vehicle, since the performance of the emergency running tire does not change significantly, in particular when the vehicle is being driven straight or in the event of slight transversal acceleration. However, in emergency running mode the wear to the emergency running tire changes considerably, and in particular the tire may be overheated on account of the increased flexing work, and this may lead to total failure of the tire as a result of thermally induced wear. Moreover, when driving through bends at high speeds, as often occurs, for example, at freeway or motorway exits, where high transversal acceleration acts on the motor vehicle, the tire may lose road grip or be overloaded. To prevent this, in emergency running tires the tire pressure is determined, and in the event of an unusual pressure loss or in the event of a tire pressure which is too low, the driver is provided with a warning indicator informing him that the vehicle is in the tire emergency running mode.

For example DE 19908701 A1 mentions recording that a tire is in an emergency running state using measurement means and making the driver aware of this by means of optical and acoustic warning devices.

Furthermore, DE 10050197 A1, when the vehicle is in tire emergency running mode, not only to provide a warning message to the driver but also to determine and display the residual distance which can be covered by the defective tire.

Working on the basis of this prior art, the invention is based on the object of increasing reliability and safety when a motor vehicle is operating with emergency running tires.

This object is achieved by the features of claim 1.

Advantageous configurations and refinements are given in the subclaims.

The invention is based on a method for ensuring reliable tire emergency running operation in a motor vehicle having emergency running tires, in which the driver is warned of a tire emergency running state. The motor vehicle comprises a device for detecting emergency running, which detects a tire emergency running mode, i.e. that the vehicle is driving with a defective tire and/or a greatly reduces tire pressure.

According to the invention, as an alternative or in addition to this warning, a device for limiting the driving speed, in the event of tire emergency running operation being detected, limits the maximum possible driving speed of the motor vehicle. This reliably prevents tire emergency running operation in a motor vehicle leading to total failure of the tire affected by the emergency running operation as a result of overheating or excessive wear.

In a refinement of the method for ensuring safe tire emergency running operation in a motor vehicle with emergency running tires, the device for limiting the driving speed limits the maximum possible driving speed of the motor vehicle if at least one further predeterminable condition is satisfied in addition to tire emergency running operation in a motor vehicle leading to a tire-induced breakdown at the tire affected by the emergency running operation. In addition, the further condition can be used to ensure that comfort is not unacceptably reduced by the speed limiting and in particular that safety is not restricted. A further condition used may, for example, be the current driving speed, the steering angle or the accelerator position, so that the further condition can be used to prevent the motor vehicle from being decelerated suddenly, in a manner which was unexpected for the driver, in the event of tire emergency running operation occurring.

Accordingly, in one configuration of the method according to the invention, the driving speed of the motor vehicle is recorded and a driving speed threshold value is predetermined as predeterminable condition, the driving speed being limited to a predeterminable limit value when the recorded driving speed drops below the driving speed threshold value, This prevents a vehicle which is driving at a high speed from being decelerated undesirably as a result of tire emergency running occurring, which would be critical to safety in particular in the event of an overtaking maneuver already having been commenced.

In a further configuration of the method, the driving speed threshold value which the driving speed has to drop below before being limited is equal to the limit value to which the driving speed is limited. This means that a vehicle is not actually decelerated at all by the device for limiting driving speed, but rather the vehicle is merely prevented from accelerating back up to a driving speed which is above the limit value when it has reached a speed below the limit value.

In another configuration of the method, a tire temperature is recorded, and a tire temperature threshold value and/or a threshold value for a change in the tire temperature over the course of time is predetermined as predeterminable condition. The driving speed is only limited to a predeterminable limit value when the recorded tire temperature is above the tire temperature threshold value or the determined change in tire temperature over the course of time is above the threshold value for the change in tire temperature. This configuration increases driving comfort when driving in a motor vehicle with tire emergency running operation, since the driving speed is only limited when driving safety is endangered by an increased tire temperature or a rapid increase in the tire temperature.

In a further configuration, the driving speed is limited to a predeterminable limit value when the recorded tire temperature is above the tire temperature threshold value at least for a predeterminable period of time or the change in the temperature over the course of time is above the threshold value for the change in tire temperature for a predeterminable period of time. This makes it easy to eliminate the effects of brief temperature change, which may also be caused by measurement errors.

In a refinement of the method, the maximum possible driving speed is determined as a function of the tire temperature and/or the changes in tire temperature over the course of time, with a plurality of driving speed values being assigned to corresponding tire temperature values in table form or a functional relationship between tire temperature and maximum possible driving speed being predetermined. In particular, above a recorded tire temperature and/or a determined change in tire temperature over the course of time, a maximum driving speed of, for example, 80 km/h which has been predetermined on the basis of the method according to the invention is reduced further to, for example, 50 km/h and/or a further warning message is given to the driver, notifying him of the increased tire temperature or the increased rise in tire temperature.

In an alternative or additional configuration of the method, an accelerator pedal displacement threshold value is predetermined, and the limiting of the driving speed is interrupted for a predeterminable period of time if the accelerator pedal is depressed by at least the pedal displacement threshold value. The predetermined accelerator pedal displacement value may, for example, be the full throttle position (kick-down position). If the accelerator pedal threshold value is reached or exceeded, the limiting of the driving speed is eliminated for a predeterminable period of time and the vehicle can be operated in the same way as a normal driving operation without tire emergency running. As an alternative to the driving speed limit being eliminated, it is also possible to switch over to a second, higher value for the driving speed limit. By way of example, it is possible for the vehicle to be accelerated to a second, replacement limit value for the driving speed if the driver fully depresses the accelerator pedal. This may be necessary, for example, in order to change lane without danger in the event of a hazardous situation caused by traffic or to be able to escape from other type of hazardous situation as quickly as possible, for example in the event of an attack.

An exemplary embodiment of the invention is explained in more detail below with reference to the drawing.

The only FIGURE shows a flow diagram of an advantageous embodiment of the method for ensuring safe tire emergency running operation in a motor vehicle with emergency running tires.

To detect tire emergency running, it is possible, for example, to monitor the tire pressure. If the tire pressure drops below a predeterminable threshold value or if the tire pressure is reduced by a predeterminable value within a predeterminable period of time, it is concluded that the vehicle is in tire emergency running mode.

As soon as tire emergency running is detected, the method is started at step 1. Then, in step 2 it is checked whether the tire temperature T of the tire in the emergency running mode exceeds a temperature threshold value $T_0$, and if so the method branches off to step 3. In step 3, it is checked whether the tire emergency running variable RN has already been set to active, the method branches off to step 5, whereas if it is inactive, the method first of all branches off to step 4, in which a time variable $t_n$ is set to zero. In step 5, a tire emergency running signal, which is provided, for example, on a data bus, is transmitted leading, in step 6, to a warning to the driver which is emitted by means of an optical display device. As a result, the driver is warned not to exceed a predeterminable maximum speed of, for example, 80 km/h. In addition or as an alternative, in step 7 a further Indication is emitted, indicating the defect in a tire and the location of the defective tire. The indication given in step 6 and 7 may, as an alternative or in addition, also be effected acoustically or supplemented by an additional acoustic indication. In step 8, the tire emergency running variable RN is set to active, and the method then continues with step 9.

In step 9, it is checked whether the actual driving speed v is below a limit speed $v_0$, and if so the method branches off to step 12. If the actual driving speed v is greater than the driving speed limit value $v_0$, in step 11 it is checked whether the time variable $t_n$ is greater than a predeterminable time value $t_0$ (e.g. 120 seconds). If this condition is satisfied, the method likewise branches off to step 14. In step 12, the speed-limiting device is activated and the maximum possible driving speed $v_{max}$ is set to be equal to the speed limit $v_0$.

In step 14, it is checked whether the accelerator pedal position G adopts a predeterminable value G=max (e.g. kick-down position) or exceeds a predeterminable threshold $G_0$. If this condition is satisfied, the method continues with step 15, in which the variable RN is set to inactive and the driving-speed limit is eliminated. In step 16, the tire emergency running operation is cancelled and/or the driver is made aware that the tire emergency running operation of the vehicle has been eliminated or interrupted. In step 17, the time variable $t_n$ is set back to zero.

The method ends at step 18, and preferably returns to one of steps 1 or 2, in which case the method is run through again for as long as a tire emergency running mode or driving with a significantly reduced tire pressure continues to obtain.

In addition or as an alternative to limiting the driving speed, the method according to the invention can also be carried out by limiting the acceleration. These means that for example in step 12 an acceleration limit value $a_0$ (e.g. 0.4 g) is predetermined instead of a speed limit value $v_0$, which means that the drive train of the vehicle accelerates the vehicle at most by this acceleration limit value. This acceleration limit value can be selected differently or preferably eliminated altogether for braking or transversal acceleration, in order to ensure the maximum steering and braking action.

The invention claimed is:

1. A method for ensuring safe tire emergency running operation in a motor vehicle that is equipped with tires having emergency running properties when the tire pressure is greatly reduced or absent altogether, and a device which detects that the motor vehicle is in a tire emergency running mode, wherein:

upon detection of tire emergency running operation, a speed limiting device limits driving speed of the motor vehicle such that it cannot exceed a limit value;

at least one further predeterminable condition must be satisfied in order for the driving speed of the motor vehicle to be limited when tire emergency running operation is detected;

an accelerator pedal displacement threshold value is predetermined; and limitation of driving speed is interrupted for a predeterminable period of time if the accelerator pedal is depressed beyond the pedal displacement threshold value.

2. The method as claimed in claim 1, wherein:

the full throttle position is predetermined as the accelerator pedal displacement threshold value; and the limit on the driving speed is interrupted for a predeterminable period of time if the accelerator pedal is moved into the full throttle position.

3. The method as claimed in claim 1, wherein:

driving speed is recorded; and a driving speed threshold value is set as a predeterminable condition; and driving speed is limited to a predeterminable limit value when the recorded driving speed drops below the driving speed threshold value.

4. The method as claimed in claim 3, wherein the driving speed threshold value is equal to the limit value.

5. The method as claimed in claim 1, wherein:

tire temperature is recorded;

a tire temperature threshold value is established as the predeterminable condition;

driving speed is limited to a predeterminable limit value when the recorded tire temperature is above the tire temperature threshold value.

6. The method as claimed in claim 5, wherein the driving speed is limited to the predeterminable limit value when the recorded tire temperature remains above the tire temperature threshold value for at least a predeterminable period of time.

7. The method as claimed in claim 1, wherein:
a change in tire temperature time is determined;
a threshold value for the change in tire temperature is predetermined as the predeterminable condition; and
the driving speed is limited to a predeterminable limit value when the determined change in tire temperature over time exceeds the threshold value.

8. The method as claimed in claim 7, wherein the driving speed is limited to a predeterminable limit value when the determined change in the tire temperature over time exceeds the threshold value for the change in tire temperature for a predeterminable period of time.

* * * * *